United States Patent
Park

(10) Patent No.: US 12,466,375 B2
(45) Date of Patent: Nov. 11, 2025

(54) OIL RESERVOIR ASSEMBLY FOR VEHICLE

(71) Applicant: HYUNDAI MOBIS CO., LTD., Seoul (KR)

(72) Inventor: Si Woo Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 500 days.

(21) Appl. No.: 17/885,875

(22) Filed: Aug. 11, 2022

(65) Prior Publication Data

US 2023/0060573 A1 Mar. 2, 2023

(30) Foreign Application Priority Data

Aug. 27, 2021 (KR) .................... 10-2021-0113622

(51) Int. Cl.
*B60T 13/14* (2006.01)
*B60T 11/26* (2006.01)
*B60T 17/06* (2006.01)

(52) U.S. Cl.
CPC ............... *B60T 13/14* (2013.01); *B60T 11/26* (2013.01); *B60T 17/06* (2013.01)

(58) Field of Classification Search
CPC ........... B60T 11/26; B60T 17/06; B60T 13/14
See application file for complete search history.

(56) References Cited

U.S. PATENT DOCUMENTS

| | | | | |
|---|---|---|---|---|
| 2,625,267 | A * | 1/1953 | Alexander | B60T 11/26 180/90 |
| 4,441,520 | A * | 4/1984 | Bruso | G05D 9/02 137/453 |
| 6,840,044 | B2 * | 1/2005 | Leboisne | B60T 17/06 60/585 |
| 7,500,723 | B2 * | 3/2009 | Hayashi | B60T 11/22 188/352 |
| 10,744,988 | B2 * | 8/2020 | Sekine | B60T 11/26 |
| 2006/0038441 | A1 * | 2/2006 | Justaman | B60T 17/04 188/73.31 |
| 2013/0232965 | A1 * | 9/2013 | Ohnishi | B60T 11/26 60/545 |

(Continued)

FOREIGN PATENT DOCUMENTS

CN 1322996 C * 6/2007
CN 101062681 A * 10/2007

(Continued)

*Primary Examiner* — Robert A. Siconolfi
*Assistant Examiner* — Mahbubur Rashid
(74) *Attorney, Agent, or Firm* — NovoTechIP International PLLC

(57) ABSTRACT

The present disclosure in some embodiments provides an oil reservoir assembly for a vehicle, the assembly comprising: a first oil reservoir formed with an outlet; a second oil reservoir spaced apart from the first oil reservoir in a lateral direction and in front of the vehicle, in fluid communication with a master cylinder, and having an inlet; a connecting member connecting the outlet and the inlet to convey a working fluid from the first oil reservoir to the second oil reservoir and a first rib located inside the second oil reservoir, extending from an upper surface of the second oil reservoir and parallel to a longitudinal direction of the vehicle, and extending in a first direction of the inlet.

10 Claims, 6 Drawing Sheets

(56) References Cited

U.S. PATENT DOCUMENTS

2018/0345943 A1* 12/2018 Kim .................. B60T 11/26
2019/0366995 A1* 12/2019 Sakakibara ............ B60T 11/26

FOREIGN PATENT DOCUMENTS

| EP | 1209054 B1 | * | 6/2006 |
| JP | 2005088772 A | * | 4/2005 |
| JP | 2005132226 A | * | 5/2005 |
| JP | 2006264429 A | * | 10/2006 |
| JP | 2007015444 A | * | 1/2007 |
| JP | 2015016832 A | * | 1/2015 |

* cited by examiner

OIL RESERVOIR ASSEMBLY FOR VEHICLE

CROSS-REFERENCE TO RELATED APPLICATIONS

This application claims the benefit of priority to Korean Patent Application No. 10-2021-0113622 filed on Aug. 27, 2021, the disclosure of which is incorporated herein by reference in its entirety.

TECHNICAL FIELD

The present disclosure relates to an oil reservoir assembly for a vehicle.

BACKGROUND

The description in this section merely provides background information related to the present disclosure and does not necessarily constitute the related art.

An electric vehicle utilizes a space of an engine room occupied by the conventional internal combustion engine as a trunk. In order to secure an installation space of the trunk in the engine room, it is necessary to modify an arrangement structure of other parts in the engine room.

For example, it may be necessary to reduce a volume of an oil reservoir coupled to a master cylinder. However, the oil reservoir needs to be able to accommodate a sufficient amount of working fluid for a wheel brake device to generate the required braking force. In order to secure an installation space of a trunk and to allow the oil reservoir to accommodate a sufficient amount of working fluid, the oil reservoir may be composed of a main reservoir and a remote reservoir that supplies oil to the main reservoir. The remote reservoir is disposed in consideration of the installation space of other component parts, and is connected to the main reservoir by a hose or the like. In this way, in addition to securing the installation space of the trunk, it is possible to accommodate a sufficient amount of working fluid.

However, since the remote reservoir is disposed to be spaced apart from the main reservoir, oil may flow backward from the main reservoir to the remote reservoir when a vehicle is turning. When the oil flows backward, the wheel brake device may malfunction due to insufficient working fluid or unwanted hydraulic pressure being formed in the wheel brake device.

SUMMARY

An oil reservoir assembly for a vehicle according to an embodiment may prevent a malfunction of a wheel brake device by forming ribs for preventing a backward flow of oil in a main reservoir.

The aspects of the present disclosure are not limited to the foregoing, and other aspects not mentioned herein will be able to be clearly understood by those skilled in the art from the following description.

According to at least one embodiment, the present disclosure provides an oil reservoir assembly for a vehicle, the assembly comprising: a first oil reservoir formed with an outlet; a second oil reservoir spaced apart from the first oil reservoir in a lateral direction and in front of the vehicle, in fluid communication with a master cylinder, and having an inlet; a connecting member connecting the outlet and the inlet to convey a working fluid from the first oil reservoir to the second oil reservoir and a first rib located inside the second oil reservoir, extending from an upper surface of the second oil reservoir and parallel to a longitudinal direction of the vehicle, and extending in a first direction of the inlet.

According to another embodiment, the present disclosure provides an oil reservoir assembly for a vehicle, the assembly comprising: a first oil reservoir formed with an outlet; a second oil reservoir disposed to be spaced apart from the first oil reservoir in a first direction parallel to a width direction in front of the vehicle, in fluid communication with a master cylinder, and formed with an inlet; and a connecting member connecting the outlet and the inlet so that a working fluid is conveyed from the first oil reservoir to the second oil reservoir, wherein the inlet is formed at a position more adjacent than a predetermined distance from a side surface of the second oil reservoir in a first direction.

According to an embodiment, an oil reservoir assembly for a vehicle can prevent a malfunction of a wheel brake device by forming ribs for preventing a backward flow of oil in a main reservoir.

DETAILED DESCRIPTION

Figure 1:
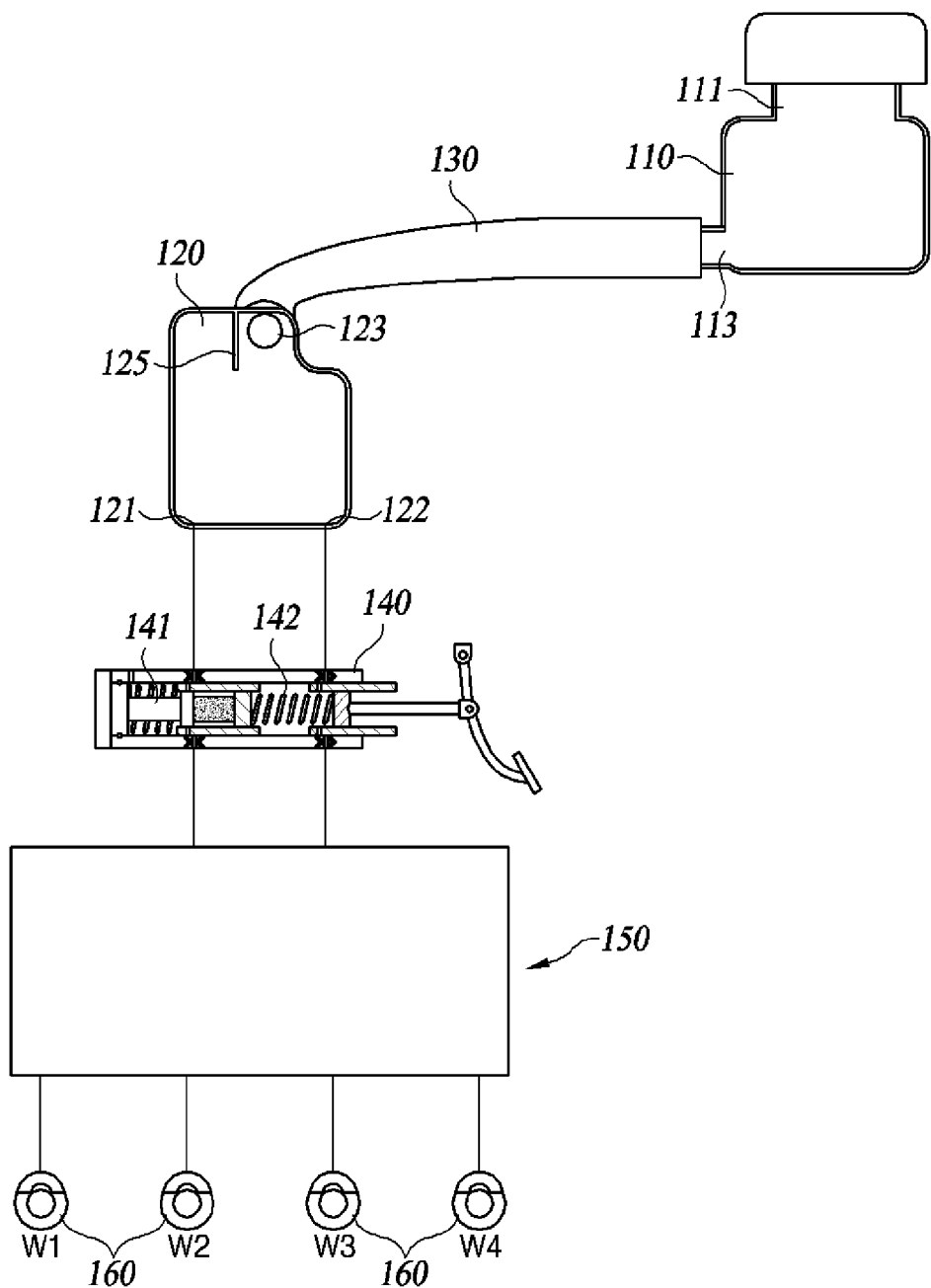
FIG. 1 is a schematic diagram illustrating a configuration of an oil reservoir assembly for a vehicle according to an embodiment of the present disclosure.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

In an embodiment of the present disclosure, a width direction and a length direction mean a horizontal direction when a vehicle is viewed from the front and a horizontal direction when the vehicle is viewed from the side, respectively. As used herein, terms such as a left turn, a right turn, left, right, front, rear, and a straight direction are defined based on the viewpoint of a driver sitting in the driver seat of the vehicle.

FIG. 1 is a schematic diagram illustrating a configuration of an oil reservoir assembly for a vehicle according to an embodiment of the present disclosure.

Referring to FIG. 1, an oil reservoir assembly for a vehicle according to an embodiment of the present disclosure includes all or part of a first oil reservoir 110, a second oil reservoir 120, and a connecting member 130.

The first oil reservoir 110 accommodates a working fluid used by a brake device of a vehicle to form hydraulic pressure. The first oil reservoir 110 may include an oil injection part 111 for injecting a working fluid. The oil injection part 111 may be formed on an upper surface of the first oil reservoir 110 to facilitate injection of the working fluid. The first oil reservoir 110 may include a cover that covers the oil injection part 111. An outlet 113 is formed in the first oil reservoir 110. The working fluid injected into the oil injection part 111 of the first oil reservoir 110 may be conveyed to the second oil reservoir 120 through the outlet 113 of the first oil reservoir 110. The first oil reservoir 110 enables to supply the working fluid to the second oil reservoir 120 without a separate power source, and is disposed at a higher position than the second oil reservoir 120 in order to suppress a backward flow of the working fluid from the second oil reservoir 120 to the first oil reservoir 110.

The second oil reservoir 120 is disposed to be spaced apart from the first oil reservoir 110 in a lateral direction or a first direction parallel to a width direction in front of a vehicle. In other words, the second oil reservoir 120 is disposed on the left or right side of the first oil reservoir 110. Here, the fact that the second oil reservoir 120 is disposed to be spaced apart from the first oil reservoir 110 in the first direction means that the second oil reservoir 120 necessarily needs to be spaced apart from the first oil reservoir 110 in the first direction, but does not exclude cases where the second oil reservoir 120 is spaced apart in different directions. For example, the second oil reservoir 120 according to an embodiment of the present disclosure includes a case in which the second oil reservoir 120 is disposed at a right rear side of the first oil reservoir 110. The separation distance in the first direction between the first oil reservoir 110 and the second oil reservoir 120 may be simply determined based on a central point of the bottom surface of each oil reservoir. Specific positions of the second oil reservoir 120 and the first oil reservoir 110 may be determined in consideration of installation positions of other components such as a trunk or suspension system of the vehicle. The first oil reservoir 110 and the second oil reservoir 120 may be fixedly installed at predetermined positions in the engine room of the vehicle. For example, the first oil reservoir 110 may be fixedly installed on a dashboard, and the second oil reservoir 120 may be fixedly installed on a cowl.

The second oil reservoir 120 may be in fluid communication with a master cylinder 140, so that a working fluid may be conveyed between the second oil reservoir 120 and the master cylinder 140. The working fluid conveyed to the master cylinder 140 is pressurized in the master cylinder 140. The hydraulic pressure of the pressurized working fluid is conveyed to a wheel cylinder (not shown) of a wheel brake 160 through a hydraulic circuit (not shown) in a hydraulic block 150 to act as braking pressure for braking a vehicle. The second oil reservoir 120 may be coupled to an upper end of the master cylinder 140. The inside of the master cylinder 140 may be partitioned into a first hydraulic chamber 141 and a second hydraulic chamber 142. In this connection, a first oil port 121 and a second oil port 122 may be provided at a lower end of the second oil reservoir 120, and the first oil port 121 and the second oil port 122 may be configured to communicate with the first hydraulic chamber 141 and the second hydraulic chamber 142, respectively.

The cylinder of the wheel brake 160 that forms the braking force of the vehicle is configured to be in fluid communication with the second oil reservoir 120 via a hydraulic circuit disposed between the second oil reservoir 120 and the wheel brake 160. An inlet 123 is formed in the second oil reservoir 120.

The connecting member 130 connects the first oil reservoir 110 and the second oil reservoir 120 to allow a working fluid to be conveyed from the first oil reservoir 110 spaced apart from the second oil reservoir 120 to the second oil reservoir 120. Both ends of the connecting member 130 are respectively connected to the outlet 113 and the inlet 123 in order to convey the working fluid from the first oil reservoir 110 to the second oil reservoir 120. The connecting member 130 may be formed of a flexible hose so as not to be damaged despite the impact applied to a vehicle, and so that the working fluid may be easily conveyed even when the positions of the oil reservoirs 110 and 120 are changed.

The working fluid injected into the oil injection part 111 may be sequentially conveyed to the first oil reservoir 110, the connecting member 130, the first oil reservoir 110, the master cylinder 140, the hydraulic block 150, and the wheel cylinder.

When the hydraulic pressure of the second oil reservoir 120 is greater than the hydraulic pressure of the first oil reservoir 110, the working fluid may flow backward from the second oil reservoir 120 to the first oil reservoir 110. When the working fluid flows backward, the brake device of a vehicle may not be able to generate the required braking pressure.

When a vehicle is stopped on a flat surface, gravity acts on the working fluid accommodated in each oil reservoir, and the oil level of the working fluid is formed perpendicular to the direction of gravity.

Figure 2:
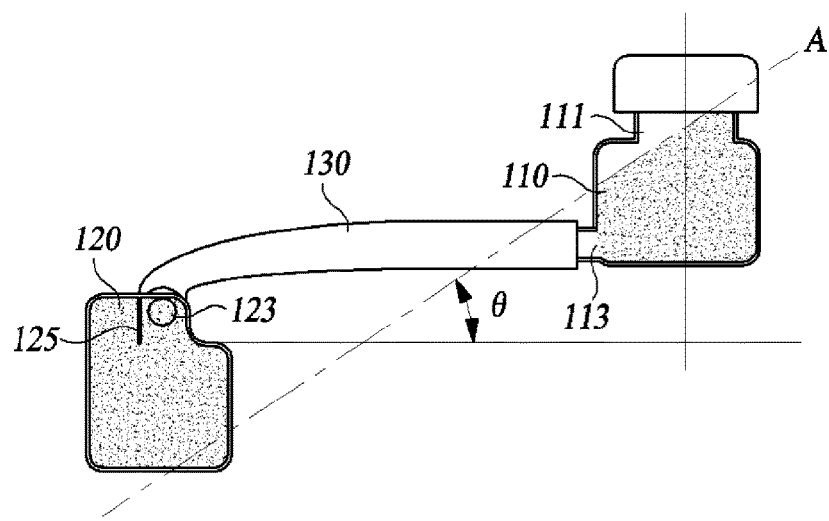
FIG. 2 is a state diagram illustrating a state in which acceleration force acts on a working fluid in an oil reservoir assembly for a vehicle according to an embodiment of the present disclosure.

FIG. 2 is a state diagram illustrating a state in which acceleration force acts on a working fluid in an oil reservoir assembly for a vehicle according to an embodiment of the present disclosure.

Referring to FIG. 2, when a vehicle turns, the gravity and accelerating force of a vehicle act together on the working fluid. The direction of the resultant force of the gravity and acceleration force forms a larger angle with the direction of gravity as the acceleration force of the vehicle increases. Here, the resultant force of the gravity and acceleration will be simply referred to as "resultant force." The hydraulic pressure of the working fluid increases as the depth of the resultant direction of the working fluid increases. The oil level of the working fluid of the first oil reservoir 110 is formed perpendicular to the direction of the resultant force. Atmospheric pressure acts on the oil level of the working fluid of the first oil reservoir 110. FIG. 2A illustrates a plane parallel to the oil level inclined by an angle of with respect to the horizontal direction by the resultant force. Atmospheric pressure acts on the oil level of the working fluid of the first oil reservoir 110, and the hydraulic pressure of the working fluid increases toward the direction of the resultant force. When the acceleration force is equal to or greater than a certain level, the pressure at which the hydraulic pressure of the working fluid in the second oil reservoir 120 and the connecting member 130 acts on the outlet 113 may be greater than atmospheric pressure and the pressure at which the hydraulic pressure of the working fluid in the first oil reservoir 110 acts on the outlet 113. Here, the pressure of the working fluid in the second oil reservoir 120 and the connecting member 130 acting on the outlet 113 is referred to as second pressure, and the pressure at which the atmospheric pressure and the hydraulic pressure of the working fluid in the first oil reservoir 110 act on the outlet 113 is referred to as first pressure. When the second pressure is greater than the first pressure, the working fluid in the second oil reservoir 120 flows backward into the first oil reservoir 110.

As the vertical gap between the first oil reservoir 110 and the second oil reservoir 120 is smaller, the working fluid is liable to flow backward from the second oil reservoir 120 to the first oil reservoir 110. In addition, as the horizontal gap between the first oil reservoir 110 and the second oil reservoir 120 is larger, the working fluid is liable to flow backward from the second oil reservoir 120 to the first oil reservoir 110. Accordingly, the second oil reservoir 120 according to an embodiment of the present disclosure may be disposed at a position spaced apart from the first oil reservoir 110 by a predetermined length or longer in a height direction. The second oil reservoir 120 may be disposed more adjacent to the first oil reservoir 110 than a predetermined distance in a first direction.

Figure 3:
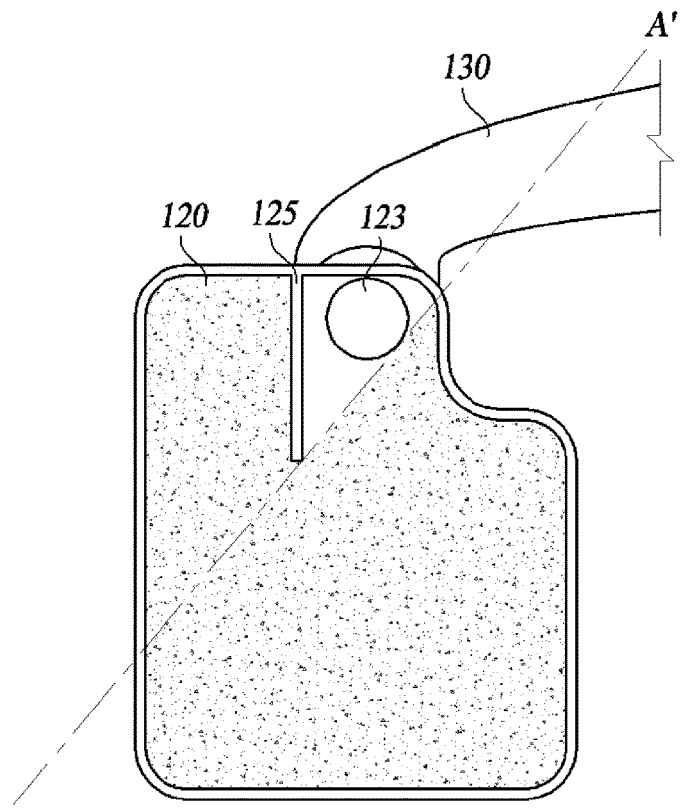
FIG. 3 is a cross-sectional diagram illustrating a second oil reservoir according to an embodiment of the present disclosure.

FIG. 3 is a cross-sectional diagram illustrating a second oil reservoir according to an embodiment of the present disclosure. For convenience of explanation, FIG. 3 illustrates a cross-section of the second oil reservoir 120 of a vehicle as viewed from the front of the vehicle.

A first rib 125 extending from an upper surface of the second oil reservoir 120 is formed inside the second oil reservoir 120. Specifically, the first rib 125 is formed in a first direction of the inlet 123 and parallel to a longitudinal (or straight) direction of a vehicle. In other words, when the first oil reservoir 110 is disposed on the right side of the second oil reservoir 120, the first rib 125 is formed on the left side of the inlet 123. In contrast, when the first oil reservoir 110 is disposed on the left side of the second oil reservoir 120, the first rib 125 is formed on the right side of the inlet 123.

FIG. 3 is a diagram illustrating an oil reservoir assembly for a vehicle of an embodiment of the present disclosure as viewed from the front of the vehicle, with the first oil reservoir 110 on the left side of the vehicle and the second oil reservoir 120 on the right side of the vehicle based on the viewpoint of a driver. FIG. 3 illustrates an oil reservoir disposed on the left side of the second oil reservoir 120 and the first rib 125 formed on the right side of the inlet 123. A' of FIG. 3 represents a plane perpendicular to a direction of the resultant force.

Referring to FIG. 3, the resultant force of the gravity and acceleration force of a vehicle acts on the working fluid in a lower left direction as the vehicle turns right. As described with reference to FIG. 2, the working fluid flows backward from the second oil reservoir 120 to the first oil reservoir 110 as the resultant force acts in the lower left direction. As the working fluid flows backward, an air pocket is formed on the left side of the first rib 125. Since the air pocket is formed, the working fluid does not leak into the outlet 113. In other words, the oil reservoir assembly for the vehicle according to an embodiment of the present disclosure can suppress a backward flow of the working fluid from the second oil reservoir 120 to the first oil reservoir 110.

The inlet 123 according to an embodiment of the present disclosure may be formed at an upper end of the upper surface or the side surface of the second oil reservoir 120. On the other hand, the inlet 123 may be formed through the upper surface and the side surface of the second oil reservoir 120. This is to allow the air forming the air pocket to smoothly escape to the first oil reservoir 110 when a direction of the resultant force is returned to a direction of gravity.

The first rib 125 extends from a top surface of the second oil reservoir 120 toward a bottom surface. As the first rib 125 is formed adjacent to the inlet 123, it is advantageous to prevent a backward flow of the working fluid. In addition, the longer the first rib 125 is formed in a height direction, the more advantageous it is to prevent a backward flow of the working fluid. The first rib 125 according to an embodiment of the present disclosure is formed more adjacent to the inlet 123 than a predetermined distance. The first rib 125 has a height of a predetermined length or longer in a direction of the lower surface of the second oil reservoir 120. Here, the fact that the first rib 125 is formed more adjacent to the inlet 123 than a predetermined distance includes a case in which the first rib 125 is in contact with the inlet 123. The height and width direction positions of the first ribs 125 may be determined in consideration of the size of the turning speed of a vehicle, and the like.

Figure 4:
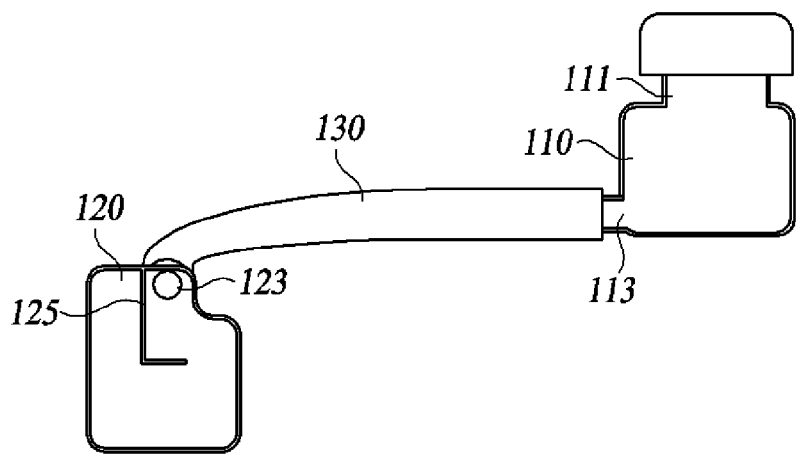
FIG. 4 is a schematic diagram illustrating an oil reservoir assembly for a vehicle according to another embodiment of the present disclosure.

FIG. 4 is a schematic diagram illustrating an oil reservoir assembly for a vehicle according to another embodiment of the present disclosure. For convenience of explanation, FIG. 4 illustrates a cross-section of the second oil reservoir 120 of a vehicle as viewed from the front of the vehicle.

Referring to FIG. 4, the first rib 125 may be formed to be bent toward the inlet 123. In other words, when the inlet 123 is on the right side of the first rib 125, the end of the first rib 125 may be bent to the right. On the other hand, when the inlet 123 is on the left side of the first rib 125, the end of the first rib 125 may be bent to the left. Although the bent portion of the first rib 125 is illustrated to form a right angle in FIG. 4, the present disclosure is not limited to such a form. For example, the first rib 125 may be bent in a curved shape or may be bent at an angle other than a right angle. The degree to which the first rib 125 is bent may be determined in consideration of the length of the first rib 125 in a height direction and the acceleration force that may act on the working fluid. By bending the first rib 125 toward the inlet 123, it is possible to prevent a backward flow of the working fluid in the range of greater acceleration force.

The first rib 125 prevents the working fluid from leaking from the second oil reservoir 120 to the first oil reservoir 110 when a vehicle turns or is tilted to the left or right. On the other hand, the first rib 125 does not interfere with a flow of the working fluid when the vehicle does not turn or is not tilted. Accordingly, the first rib 125 does not prevent the conveyance of the working fluid from the first oil reservoir 110 to the master cylinder through the second oil reservoir 120. By forming the first rib 125, it is possible to prevent malfunction of a brake system of a vehicle with a simple structure.

Figure 5:
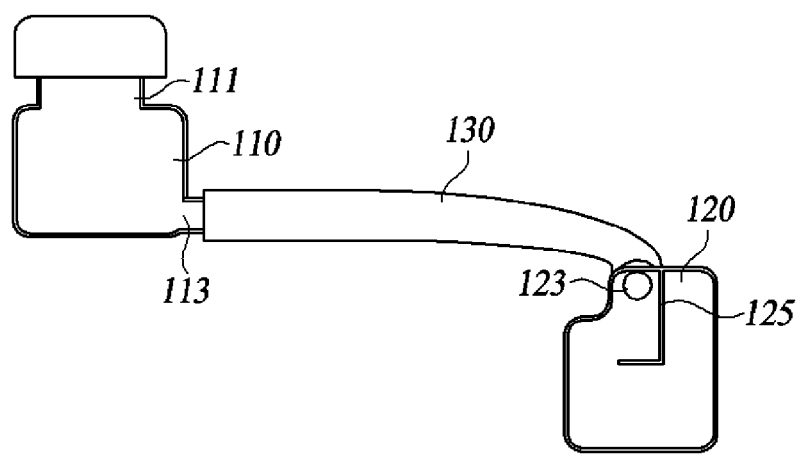
FIG. 5 is a schematic diagram of an oil reservoir assembly for a vehicle according to another embodiment of the present disclosure.

FIG. 5 is a schematic diagram of an oil reservoir assembly for a vehicle according to another embodiment of the present disclosure. For convenience of explanation, FIG. 5 illustrates a cross-section of the second oil reservoir 120 of a vehicle as viewed from the front of the vehicle.

In FIG. 5, the first oil reservoir 110 is disposed on the right side of the second oil reservoir 120. In this arrangement, when a vehicle turns left, the working fluid may flow backward from the second oil reservoir 120 to the first oil reservoir 110. The first rib 125 is installed on the right side of the inlet 123 to prevent a backward flow of the working fluid. The mechanism for preventing the backward flow of the working fluid by a partition wall and the possible structure of the first rib 125 correspond to the descriptions of FIGS. 2 to 4, and thus a detailed description thereof will be omitted.

Figure 6:
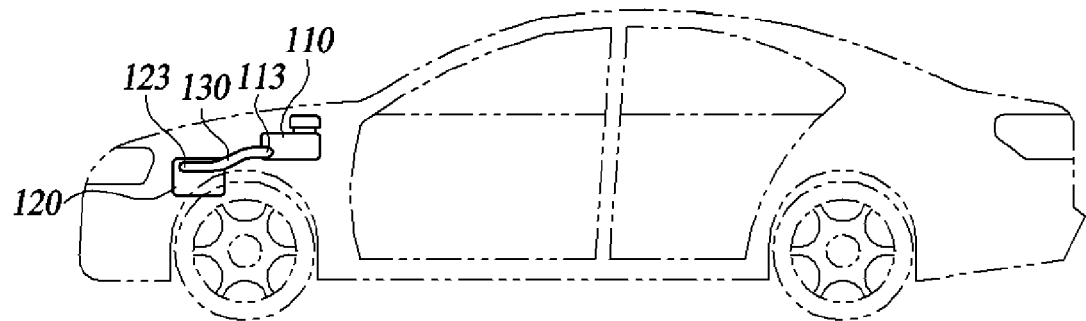
FIG. 6 is a schematic diagram illustrating an oil reservoir as viewed from the side of the vehicle according to an embodiment of the present disclosure.

FIG. 6 is a schematic diagram illustrating an oil reservoir as viewed from the side of the vehicle according to an embodiment of the present disclosure.

When a vehicle decelerates, the working fluid in the oil reservoir is leaned toward the front of the vehicle. Accordingly, when the second oil reservoir 120 is disposed at the rear of the first oil reservoir 110, the working fluid may flow backward from the second oil reservoir 120 to the first oil reservoir 110 when the vehicle decelerates.

Referring to FIG. 6, the second oil reservoir 120 is disposed to be spaced apart from the first oil reservoir 110 in a longitudinal or straight direction of a vehicle. By disposing the first oil reservoir 110 at the rear of the second oil reservoir 120, when the vehicle decelerates, a backward flow of the working fluid from the second oil reservoir 120 to the first oil reservoir 110 may be prevented.

In contrast, when the vehicle accelerates, the working fluid may be leaned toward the rear of the oil reservoir. However, in general, the acceleration force acting on the working fluid when the vehicle accelerates forward in a road driving situation is not greater than the acceleration force acting on the working fluid when the vehicle decelerates due to a sudden stop.

Figure 7:
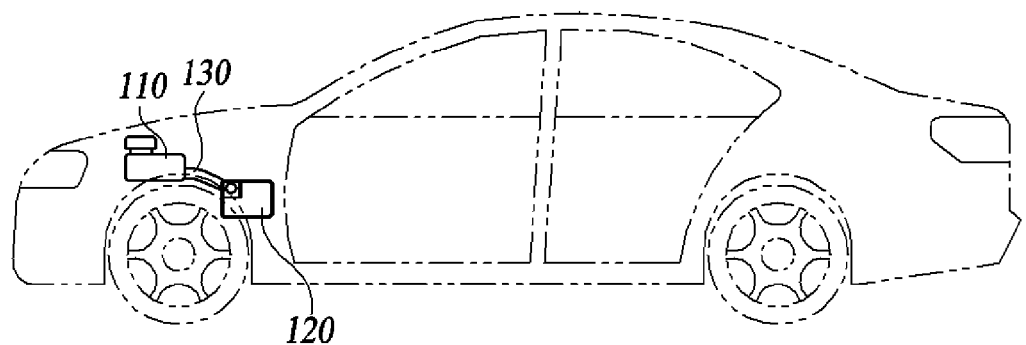
FIG. 7 is a schematic diagram illustrating an oil reservoir assembly for a vehicle as viewed from the side of the vehicle according to another embodiment of the present disclosure.

FIG. 7 is a schematic diagram illustrating an oil reservoir assembly for a vehicle as viewed from the side of the vehicle according to another embodiment of the present disclosure.

Figure 8:
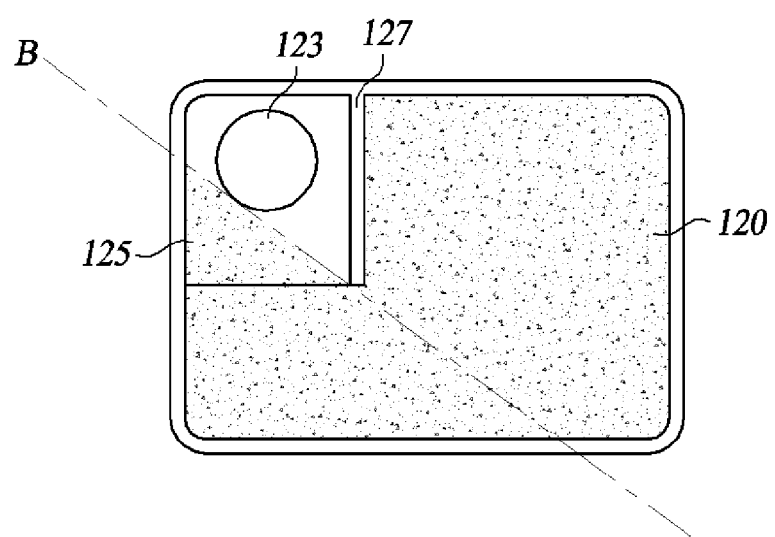
FIG. 8 is a cross-sectional diagram illustrating a second oil reservoir according to another embodiment of the present disclosure.

FIG. 8 is a cross-sectional diagram illustrating the second oil reservoir 120 according to another embodiment of the present disclosure.

Unlike the first oil reservoir 119, since the second oil reservoir 120 is installed close to the master cylinder and the hydraulic block 150, it may be required to dispose the second oil reservoir 120 at the rear of the first oil reservoir 110 due to an installation space issue.

Referring to FIG. 7, in the oil reservoir assembly for the vehicle according to an embodiment of the present disclosure, the first oil reservoir 110 is disposed to be spaced apart from the second oil reservoir 120 in a straight direction of the vehicle. In other words, the second oil reservoir 120 is disposed at the rear of the first oil reservoir 110. Since the second oil reservoir 120 is disposed at the rear of the first oil reservoir 110, the working fluid may flow backward from the second oil reservoir 120 to the first oil reservoir 110 when the vehicle decelerates.

Referring to FIGS. 7 and 8, in order to prevent the working fluid from flowing backward into the first oil reservoir 110, a second rib 127 is formed at the rear of the inlet 123 of the second oil reservoir 120. Specifically, the second rib 127 extending from an upper surface of the second oil reservoir 120 and parallel to a first direction is formed inside the second oil reservoir 120. The second rib 127 forms an air pocket in front of the second rib 127 when acceleration force is applied to the front of the working fluid such as when a vehicle decelerates to prevent the working fluid from leaking into the inlet 123. A detailed description of the mechanism by which the second rib 127 prevents a backward flow of the working fluid corresponds to the description of the first rib 125, and thus will be omitted. In this way, even when the second oil reservoir 120 is disposed at the rear of the first oil reservoir 110, a backward flow of the working fluid from the second oil reservoir 120 to the first oil reservoir 110 may be prevented. The second rib 127 may be formed to surround the first rib 125 and the inlet 123 in an 'L' shape. The second rib 127 has a height equal to or greater than a predetermined length in the direction of a lower surface. The second rib 127 may be formed to be bent in a straight direction of the vehicle. Since the description of the possible structure of the second rib 127 corresponds to the description of the first rib 125, a detailed description thereof will be omitted.

Figure 9:
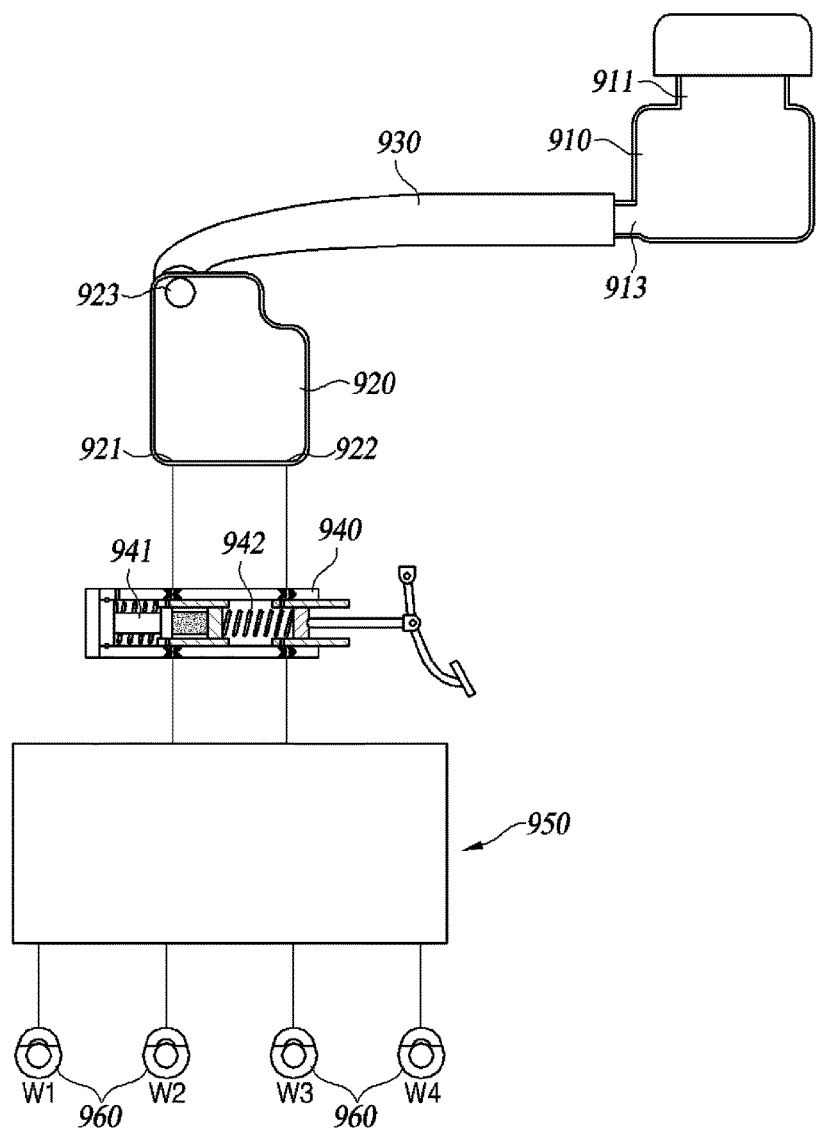
FIG. 9 is a schematic diagram illustrating a configuration of an oil reservoir assembly for a vehicle according to an embodiment of the present disclosure.

FIG. 9 is a schematic diagram illustrating a configuration of an oil reservoir assembly for a vehicle according to an embodiment of the present disclosure.

Referring to FIG. 9, an oil reservoir assembly for a vehicle according to an embodiment of the present disclosure includes all or part of a first oil reservoir 910, a second oil reservoir 920, and a connecting member 930.

The first oil reservoir 910 accommodates a working fluid used by a brake device of a vehicle to form hydraulic pressure. In the first oil reservoir 910, an oil injection part 911 may be formed to inject a working fluid. An outlet 913 is formed in the first oil reservoir 910. The working fluid injected into the oil injection part 911 of the first oil reservoir 910 may be conveyed to the second oil reservoir 920 through the outlet 913 of the first oil reservoir 910. The first oil reservoir 910 enables to supply the working fluid to the second oil reservoir 920 without a separate power source, and is disposed at a higher position than the second oil reservoir 920 in order to suppress a backward flow of the working fluid from the second oil reservoir 920 to the first oil reservoir 910.

The second oil reservoir 920 is disposed to be spaced apart from the first oil reservoir 910 in a lateral direction or a first direction parallel to a width direction in front of a vehicle. Here, the fact that the second oil reservoir 920 is disposed to be spaced apart from the first oil reservoir 910 in the first direction means that the second oil reservoir 920 necessarily needs to be spaced apart from the first oil reservoir 910 in the first direction, but does not exclude cases where the second oil reservoir 920 is spaced apart in different directions. The second oil reservoir 920 may be in fluid communication with a master cylinder 940, so that a working fluid may be conveyed between the second oil reservoir 920 and the master cylinder 940. The hydraulic pressure of the pressurized working fluid is conveyed to a wheel cylinder (not shown) of a wheel brake 960 through a hydraulic circuit (not shown) in a hydraulic block 950 to act as braking pressure for braking a vehicle. The inside of the master cylinder 940 may be partitioned into a first hydraulic chamber 941 and a second hydraulic chamber 942. In this connection, a first oil port 921 and a second oil port 922 may be provided at a lower end of the second oil reservoir 920, and the first oil port 921 and the second oil port 922 may be configured to communicate with the first hydraulic chamber 941 and the second hydraulic chamber 942, respectively. An inlet 923 is formed in the second oil reservoir 920.

The connecting member 930 connects the first oil reservoir 910 and the second oil reservoir 920 to allow a working fluid to be conveyed from the first oil reservoir 910 spaced apart from the second oil reservoir 920 to the second oil reservoir 920. Both ends of the connecting member 930 are respectively connected to the outlet 913 and the inlet 923 in order to convey the working fluid from the first oil reservoir 910 to the second oil reservoir 920. The connecting member 930 may be formed of a flexible hose so as not to be damaged despite the impact applied to a vehicle, and so that the working fluid may be easily conveyed even when the positions of the oil reservoirs are changed. The working fluid injected into the oil injection part 911 may be sequentially conveyed to the first oil reservoir 910, the connecting member 930, the first oil reservoir 910, the master cylinder 940, the hydraulic block 950, and the wheel cylinder.

The inlet 923 according to an embodiment of the present disclosure is formed at a position more adjacent than a predetermined distance from a side surface of the second oil reservoir 920 in a first direction.

In other words, when the first oil reservoir 910 is disposed on the left side of the second oil reservoir 920, the inlet 923 is formed more adjacent to the right side of the first oil reservoir 910 than a predetermined distance. According to this structure, when a vehicle turns right, an air pocket is formed in the inlet 923 of the second oil reservoir 920. When the air pocket is formed, the working fluid no longer leaks from the second oil reservoir 920 to the first oil reservoir 910.

Alternatively, when the first oil reservoir 910 is disposed on the right side of the second oil reservoir 920, the inlet 923 is formed more adjacent to the left side of the first oil reservoir 910 than a predetermined distance. According to this structure, when a vehicle turns left, an air pocket is formed in the inlet 923 of the second oil reservoir 920. When the air pocket is formed, the working fluid no longer leaks from the second oil reservoir 920 to the first oil reservoir 910.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An oil reservoir assembly for a vehicle, comprising:
   a first oil reservoir having an outlet;
   a second oil reservoir in fluid communication with a master cylinder of the vehicle, having an inlet and spaced apart from the first oil reservoir in a width direction of the vehicle;
   a connecting member extending between the outlet of the first oil reservoir and the inlet of the second oil reservoir and configured to convey a working fluid from the first oil reservoir to the second oil reservoir; and
   a first rib disposed within the second oil reservoir, protruding downwardly from an upper surface of the second oil reservoir, extending in a longitudinal direction of the vehicle, and adjoining the inlet in the width direction of the vehicle,
   wherein, when the vehicle turns, an air pocket is formed on a side of the first rib in the width direction and blocks the inlet of the second oil reservoir to suppress a backward flow of the working fluid from the second oil reservoir to the first oil reservoir.

2. The oil reservoir assembly of claim 1, wherein the first rib is located within a predetermined distance from the inlet.

3. The oil reservoir assembly of claim 1, wherein the first rib has a predetermined length in a vertical direction of the vehicle.

4. The oil reservoir assembly of claim 1, wherein the first rib has an end portion bent in the width direction toward the inlet.

5. The oil reservoir assembly of claim 1, wherein the inlet is located at the upper surface or a side surface of the second oil reservoir.

6. The oil reservoir assembly of claim 1, wherein the second oil reservoir is spaced apart from the first oil reservoir by at least predetermined distance in a height direction of the vehicle.

7. The oil reservoir assembly of claim 1, wherein the second oil reservoir is located at a position closer than predetermined distance from the first oil reservoir in the width direction.

8. The oil reservoir assembly of claim 1, wherein the second oil reservoir is spaced apart from the first oil reservoir in the longitudinal direction of a vehicle.

9. The oil reservoir assembly of claim 1, wherein:
   the second oil reservoir is spaced apart from the first oil reservoir in the longitudinal direction of the vehicle,
   a second rib extending from the upper surface of the second oil reservoir in the width direction is located inside the second oil reservoir, and
   the second rib is located at a rear of the inlet.

10. The oil reservoir assembly of claim 1, wherein the first oil reservoir comprises an oil injection part for injecting the working fluid.

* * * * *